United States Patent [19]
Nagashima et al.

[11] Patent Number: 6,088,475
[45] Date of Patent: *Jul. 11, 2000

[54] METHOD AND APPARATUS FOR FORMING AND CORRECTING COLOR IMAGE

[76] Inventors: Mieko Nagashima, 5-13-9-901. Roppongi; Akinobu Hatada, 3-19-20-102, Takanawa; Toku Nagashima, 5-13-9-901, Roppongi, all of Minato-ku, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/352,311
[22] Filed: Dec. 8, 1994
[51] Int. Cl.[7] .................................................... G06K 9/00
[52] U.S. Cl. ........................... 382/162; 382/167; 358/518
[58] Field of Search .................................... 382/162, 254, 382/167; 355/68, 327, 38, 77; 358/518, 575

[56] References Cited

U.S. PATENT DOCUMENTS

| | | |
|---|---|---|
| 4,999,668 | 3/1991 | Suzuki et al. ............................. 355/38 |
| 5,196,883 | 3/1993 | Takagi et al. ....................... 355/326 M |
| 5,262,833 | 11/1993 | Fukushima et al. ..................... 355/327 |
| 5,281,995 | 1/1994 | Terashita et al. ........................... 355/68 |
| 5,289,295 | 2/1994 | Yumiba et al. ........................... 358/518 |
| 5,339,365 | 8/1994 | Kawai et al. ............................. 382/254 |

OTHER PUBLICATIONS

Kanamori, K.., et al., "Sensitive Color Control Method in the Color Perception Space," Journal of Picture Electronic Association (1989) 15:18, pp. 302–312.

*Primary Examiner*—Jose L. Couso
*Assistant Examiner*—Anh Hong Do
*Attorney, Agent, or Firm*—Morrison & Foerster LLP

[57] ABSTRACT

A color image forming and correcting method and apparatus employ a combination of neural network and fuzzy logic processing to reduce differences in reproducibility in the image system of device. An information value specifying a color gamut in coordinate system of the perceptual color space is entered and associated with an information value specifying a preset other color gamut by the combined techniques. The color gamut is converted into a preset color gamut in the coordinate system. The information value specifying the converted color gamut is outputted.

7 Claims, 19 Drawing Sheets

(a) THRESHOLD VALUE FUNCTION (b) SIGMOID FUNCTION

METHOD AND APPARATUS FOR FORMING AND CORRECTING COLOR IMAGE

FIELD OF THE INVENTION

This invention relates to a method and apparatus for forming and correcting a color image for correcting difference in color reproducibility between different color image processing devices so that the resulting corrected color reproducibility will be perceived to be psychologically more acceptable.

RELATED ART

With recent promulgation of color printing devices and large-capacity storage devices, electronic color image information is being utilized in increasing numbers, such as by storing an image of a color display in the form of a hard copy or preparing and storing a large quantity of color prints for later printing.

However, it is a frequent occurrence that the same color image information my be perceived to the human eye as being different color images due to difference in fidelity of an input device or an output device with respect to color reproduction.

For example, the color reproducibility of color printers of different manufacturers differs from one manufacturer to another. In addition, a significant difference has been felt in color reproducibilty between the image of a color display and that of a color printer depending on the difference in the color information volume.

FIG. 26 shows color reproduction gamuts of commonplace monitor and printer. In FIG. 26, luminosity L* is plotted against saturation C* as prescribed in L*a*b* color specification system of CIE 1976 (recommendation by Commission Internationale de Enluminure, referred to hereinafter CIE recommendations). Meanwhile, C* is given by the following equation:

$$C^* = \sqrt{(a^*)^2 + (b^*)^2} \quad (1)$$

As shown in this figure, a significant difference is observed between the color reproduction gamuts between the two devices.

FIG. 27 shows coordinates of the monitor and the printer in the L*a*b* color specification system. It is seen that the printer has a color reproduction gamut narrower than that of the monitor and undergoes position deviation in the color reproduction gamut.

In general, a color gamut that can be outputted differs from one output device to another. If color image data conversion is to be performed between output devices having different color reproduction gamuts, color gamut re-arrangement is done in some form or other.

If the partial color areas for which the human being feels a psychological meaning, such as the blue color recognized as the sky color or the yellow color recognized as the lemon color, are distributed as shown in FIG. 28, it is desirable that these colors after image data conversion be mapped within these ranges. However, as shown in FIGS. 29 or 30, there are occasions wherein, if color information exchange is done only mechanically, the colors be mapped in areas other than the color area shown in FIG. 28.

In color image data exchange from the monitor image information to the printer image information shown in FIG. 29, the color reproduction gamut of the printer information is narrow so that, after mapping part of the partial color area A' is lost. In the color image data exchange in the opposite direct ion to that shown in FIG. 29, there is produced a deviation in a partial color area A" after mapping, as shown in FIG. 30.

If, in re-arranging the color information, the color reproduction gamut is not corrected sufficiently for position deviation or difference in the gamut for color reproduction, it invokes a psychologically alien feeling for the viewer.

There has been disclosed in the prior art a selective color hue adjustment system of a color image in the color perceptual space which consists in changing only a particular color for color hue adjustment of e.g., a color hard copy (Journal of Picture Electronic Association, vol.18, no. 15). In the prior-art technique, only a particular color is changed in color hue adjustment in order to avoid the color hue of the entire image being changed in addition to the area whose color is to be changed.

FIG. 31 is a block diagram showing the above-mentioned prior art. For specifying the color gamut to be processed and the direction and quantity of color hue adjustment, the H*ab, L*, C*ab coordinate systems of the polar coordinates in the L*a*b* space. As for the color gamut to be adjusted, color designation is made using the membership function, while the quantity of color hue adjustment is weighted using the membership function. The color gamut extraction is made in consideration of continuity of the color space.

A three-dimensional lookup table, in which selective color hue adjustment φC and color correction φM as to the representative lattice points of the color space are made in advance, is prepared, and color space lattice points are interpolated based upon this lookup table in order to prepare an image.

SUMMARY OF THE DISCLOSURE

As discussed hereinabove, color reproducibility differs with machine types of the same apparatus, while the gamut for color reproduction, which is an extent of possible color reproduction, also differs with different image apparatus, such as color displays, color printers or color image scanners, such that color hue adjustment needs to be carried out in order to obtain desired color reproducibility.

In the above descried prior-art color hue adjustment, since arithmetic-logical operations are carried out using a lookup table processed in many ways, processing is time consuming, while it is difficult to reduce the time required for processing. The membership function is employed only for securing continuity if the color space of the color gamut which is to be adjusted, while there is no explicit reference to how the membership function is to be employed for color correction of the entire image.

The conventional practice in eliminating position deviation or difference in the gamut for color reproduction has been to cut off, curtail or compress the non-coincident portions of the gamut for color reproduction. However, this leads merely to deviation in saturation or chromaticity.

It is therefore an object of the present invention to provide a method and apparatus for forming and correcting a color image whereby the difference in color reproducibility in an image system or apparatus may be diminished for realizing proper color reproduction.

For accomplishing the above object, the present invention provides many aspects.

In one aspect, the present invention provides a method for forming and correcting a color image having the steps of entering an information value representing a color gamut in a coordinate system of a perceptual color space, associating the information value with an information value representing an other color gamut determined by a pre-set color gamut with the aid of a first fuzzy processing from one color component to another for converting, by such association, the color gamut in the coordinate system of the perceptual color space into a converted color gamut which is a prescribed color gamut, and outputting an information value representing the converted color gamut in the coordinate system.

If the input signal is an image signal, the input image signal is converted into an information value representing a color gamut in a coordinate system of a perceptual color space with the aid of a second fuzzy processing, the information value is converted in accordance with the steps as defined in the first aspect, the converted information value is converted into and outputted as a image signal with the aid of a third fuzzy processing.

The conversion into the conversion color gamut is preferably carried out in the following manner.

That is, a pre-set reproduction color gamut of an input device and a pre-set reproduction color gamut of an output device are compared to each other for extracting a color gamut thereof, the color gamut is divided into plural partial color areas based upon plural pre-set memory colors from one color component to another, the reproduction color gamut of the input device or the reproduction color gamut of the output device, whichever is narrower, is divided into plural partial color areas based upon the memory color from one color component to another, and an information value representing the partial color gamut in the color gamut is associated into an information value representing the partial color gamut in the narrower color gamut according to a color area of the input signal by way of mapping with the aid of the first fuzzy processing.

In extracting the color gamut, the extraction is preferably made with the aid of a fourth fuzzy processing. The first to fourth fuzzy processing preferably employs at least one of the fuzzy filter arithmetic-logical processing, neural network arithmetic-logical processing and a fuzzy associative memory arithmetic-logical processing. The perceptual color space is preferably the uniform perceptual color space recommended by CIE or one of the color specification systems (for example, XYZ) recommended by CIE. The fuzzy processing is employed for at least one of conversions from an image signal into a perceptual color space or vice versa in the conversion of the input/output signals.

In its second aspect, the present invention provides an apparatus for forming and correcting a color image including a color gamut converting means configured for entering an information value representing a color gamut in a coordinate system of a perceptual color space, associating the information value with an information value representing an other color gamut determined by a pre-set color gamut with the aid of a first fuzzy processing from one color component to another for converting, by such association, the color gamut in the coordinate system of the perceptual color space into a converted color gamut which is the pre-set color gamut, and outputting the information value representing the converted color gamut in the coordinate system.

If the input signal to the color image forming and correcting apparatus of the present invention is a signal other than the information value representing the color gamut in the coordinate system of the perceptual color space, the apparatus is preferably provided with input converting means for converting an input image signal into an information value representing a color gamut in a coordinate system of a perceptual color space with the aid of second fuzzy processing means, the color gamut converting means and output converting means for converting the output information value of the color gamut converting means into an image signal with the aid of third fuzzy processing means.

Preferably, the color gamut converting means has extracting means for comparing a pre-set reproduction color gamut of an input device and a pre-set reproduction color gamut of an output device and extracting a color gamut thereof, discriminating means for dividing the color gamut into plural partial color areas based upon plural pre-set memory colors from one color component to another, dividing the reproduction color gamut of the input device or the reproduction color gamut of the output device, whichever is narrower, into plural partial color areas based upon the memory colors from one color component to another, and mapping means for associating an information value representing the partial color gamut in the color gamut into an information value representing the partial color gamut in the narrower color gamut according to a color area of the input signal with the aid of the first fuzzy processing means for converting into an information value representing the converted color gamut which is a prescribed color gamut.

It is preferred that the extracting means is extracting the color gamut with the aid of a fourth fuzzy processing means, and the first to fourth fuzzy processing means employs at least one of the fuzzy filter arithmetic-logical processing, neural network arithmetic-logical processing and a fuzzy associative memory arithmetic-logical processing. It is also preferred that the fuzzy processing means is employed for conversion from an image signal into perceptual color space or vice versa.

It is similarly preferred that the perceptual color space is one of the color specification systems recommended by CIE, such as the uniform perceptual color space or the XYZ color specification system. It is also preferred that the color image correcting apparatus is built into a color image processing system. It is further preferred that the color image processing system into which the entire color image correcting device of the present invention is built, is controlled with the aid of a fuzzy processing. It is still further preferred that the color image correcting apparatus be enclosed in an apparatus carrying out color image processing.

It is further preferred that the color information of mutually corresponding representative points of the two color gamuts can be selectively set by the user in the respective representative point storage means A and B. The same may be achieved via an other external device, such as a memory.

In its third aspect, the present invention generally provides a color image forming and correcting apparatus having the following features.

That is, the method for forming and correcting a color image employing a color image forming and correcting apparatus having storage means for storing a reproduction color gamut of an input device and storage means for storing a reproduction color gamut of an output device presents and selects pre-set color candidate data based upon psychological memory colors for correcting and adjusting aesthetically representative data for color matching stored in the storage means with the aid of modifying and designating one or more of the luminance, saturation and color hue.

OPERATION

According to the present invention, the color information is re-formed or corrected by converting the color gamuts between image devices having different color reproduction gamuts for enabling an image to be reproduced as a more amenable image to the sense of the human being by taking advantage of the psychological effect that a color having difference in the color reproduction gamuts in various image devices appears to the eye of the human being as being the same color depending upon the relation with the ambient color.

In the method and apparatus for forming and correcting the color image in the present invention, an information value of the XYZ color specification system or the L*a*b* color specification system, outputted from a spectrographic colorimeter, such as the colorimeter or a color-difference meter, is entered as an information value representing the color gamut in the coordinate system of the perceptual color space. Using the first fuzzy processing, color gamut conversion is carried out by way of associating the information value with the information value of the color components in the color gamut for conversion into color gamut more amenable to the sense of the human being with the aid of the fuzzy processing for signal conversion and processing (claims 1 and 9).

Among the input and output image signals between image devices, there are, in general, RGB signals (red, green and blue signals) employed for image equipments, YMC (yellow, magenda and cyan) signals employed for printing devices and YMC[K] (yellow, magenda, cyan and black) signals. When entering these image signals to the color image forming and correcting apparatus according to the present invention, the values of the image signals are converted by third fuzzy processing into values of the perceptual color space for conversion into desirable information values for carrying out the signal processing in the present invention (claims 2 and 10).

The color gamut of the input signal is divided into plural partial color areas and one or more representative points contained in one partial color area are associated with representative points of a pre-set other partial color area by way of mapping. This enlarges or reduces the range of the partial color areas of the input information value or image signals while correcting position deviation for achieving mapping free of alien feeling from one partial color area to another. The respective partial color areas are converted and the overall color reproduction gamut is corrected for reducing the difference in color reproducibility between the different image devices (claims 3 and 11).

Further, in claims 3 and 10, the color gamut is divided into partial color areas based upon the memory colors. For example, although the blue color, recognized as being the sky color, differs from one person to another, the sky color memorized by persons is confirmed to be distributed over a range having a pre-set extent. Since the dividing into partial color areas is made using the memory colors having a certain range, dividing more amenable to the sense of the human being may be achieved.

Since mapping is performed using information values contained in the color regions of the pre-set color gamut of the input device and the pre-set color gamut of the output device and, if necessary, in the differntial color gamut portions, color gamuts can be sufficiently formed and corrected with a smaller number of processing operations. The differential color gamut portions can be extracted using fuzzy processing, that is, they can be extracted by finding the membership function and processing in accordance with the fuzzy rule (claims 4 and 12).

According to the present invention, the first fuzzy processing is preferably a fuzzy filter arithmetic-logical processing, a neural network arithmetic-logical processing, a fuzzy associative memory arithmetic-logical processing or the combination thereof, such as the combination of the fuzzy filter and the neural network. The first to fourth fuzzy processing may be the same or different fuzzy processing operations (claims 5 and 13). Heretofore, The conversion by a lookup table or polynominal approximate operations by a matrix has been employed for the conversion from the image signal to the perceptual color space or vice versa. According to the present invention, the fuzzy processing similar to the first to fourth fuzzy processing is employed for shortening the processing time and improving the conversion accuracy (claims 6 and 14).

For the perceptual color space, the L*a*b* color specification system, the L*u*v* color specification system or the XYZ color specification system recommended by CIE (claims 7, 8, 15, 16).

The color image forming and correcting apparatus of the present invention may be built into a color image processing system so as to be used as an interface device between input and output devices (claim 17). The color image forming and correcting apparatus of the present invention may also be enclosed in, for example, the printer device, and as a result, the above operations have been achieved (claim 19). The color image processing system in its entirety, in which there is built the color image correcting apparatus of the present invention, may be fuzzy-controlled for reducing the processing time (claim 18).

By having the color image forming and correcting apparatus of the present invention enclosed within various image equipments, corrected color signals are outputted from the image equipments, so that there is provided an image equipment which does not produce alien feeling with respect to the color reproducibility (claim 19). The color information of mutually corresponding representative points in the two color gamuts can be selectively set by the user to provide a desirable user interface (claims 20 and 21).

PREFERRED EMBODIMENTS OF THE INVENTION

Preferred embodiments of the present invention will be explained in detail hereinbelow.

Figure 1:
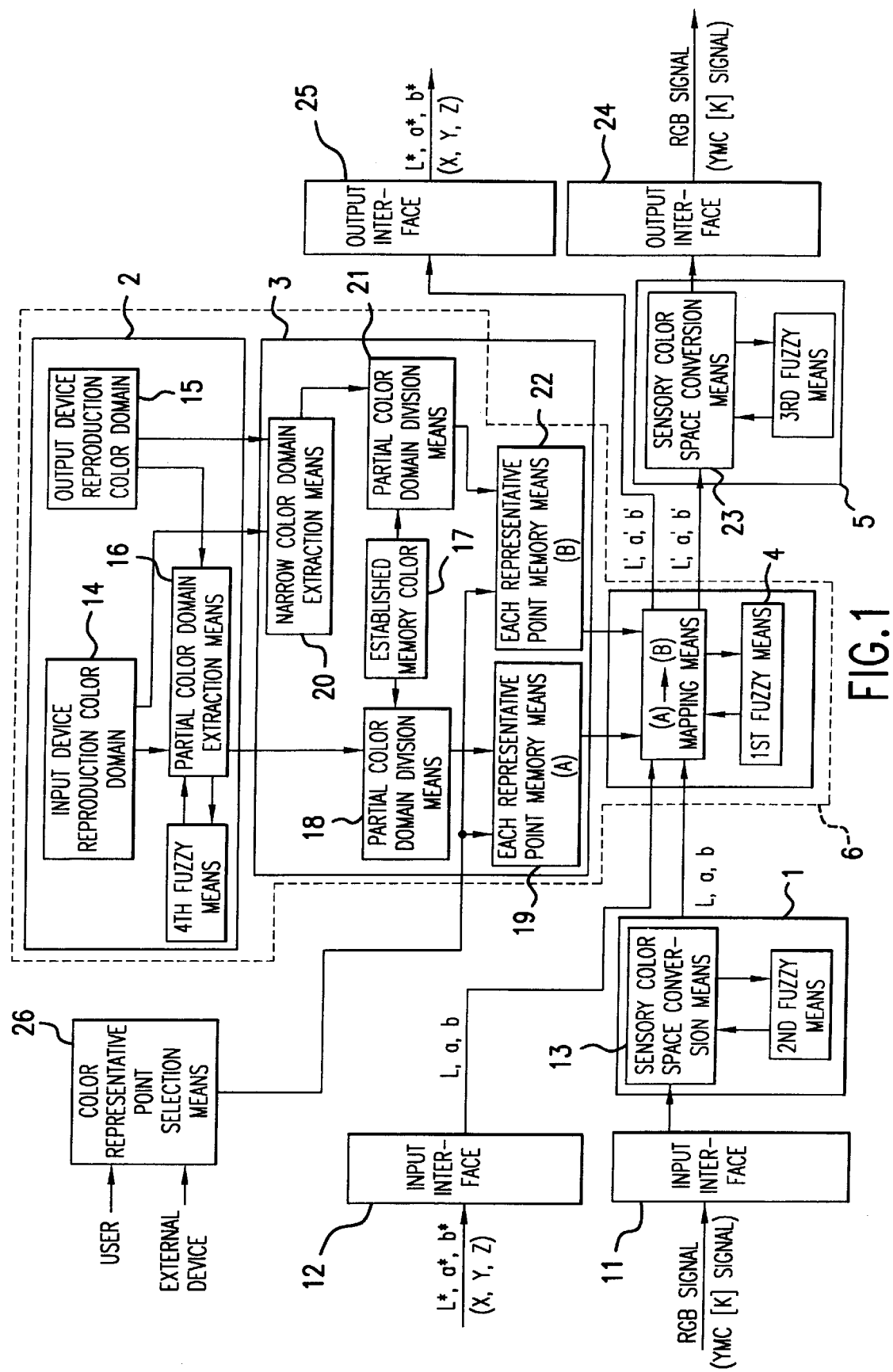
FIG. 1 is a block diagram showing an embodiment of the present invention.

FIG. 1 is a block diagram for color image correction according to the present invention to which fuzzy processing is applied. In this figure, input signals are image signals or information values representing color gamuts of a coordinate system of a perceptual color space. The image signals, such as RGB signals, enter input converting means 1 via an input interface 11, and are converted by the input converting means 1 into information values representing the color area of the coordinate system of the perceptual color space, such as, color gamut of a L*a*b* color specification system, which is a coordinate system of the uniform perceptual color space according to the CIE recommendations. The converted information value is outputted to color area converting means 6. On the other hand, information values representing the color area of the coordinate system of the perceptual color space, such as information values of the L*a*b* color specification system, enter color area converting means 6 via an input interface 12.

Second fuzzy processing is carried out in the input converting means 1 in order to find the membership function of the input RGB signals and in order to effect conversion to the color gamut of the L*a*b* color specification system in accordance with the fuzzy rule.

Figure 2:
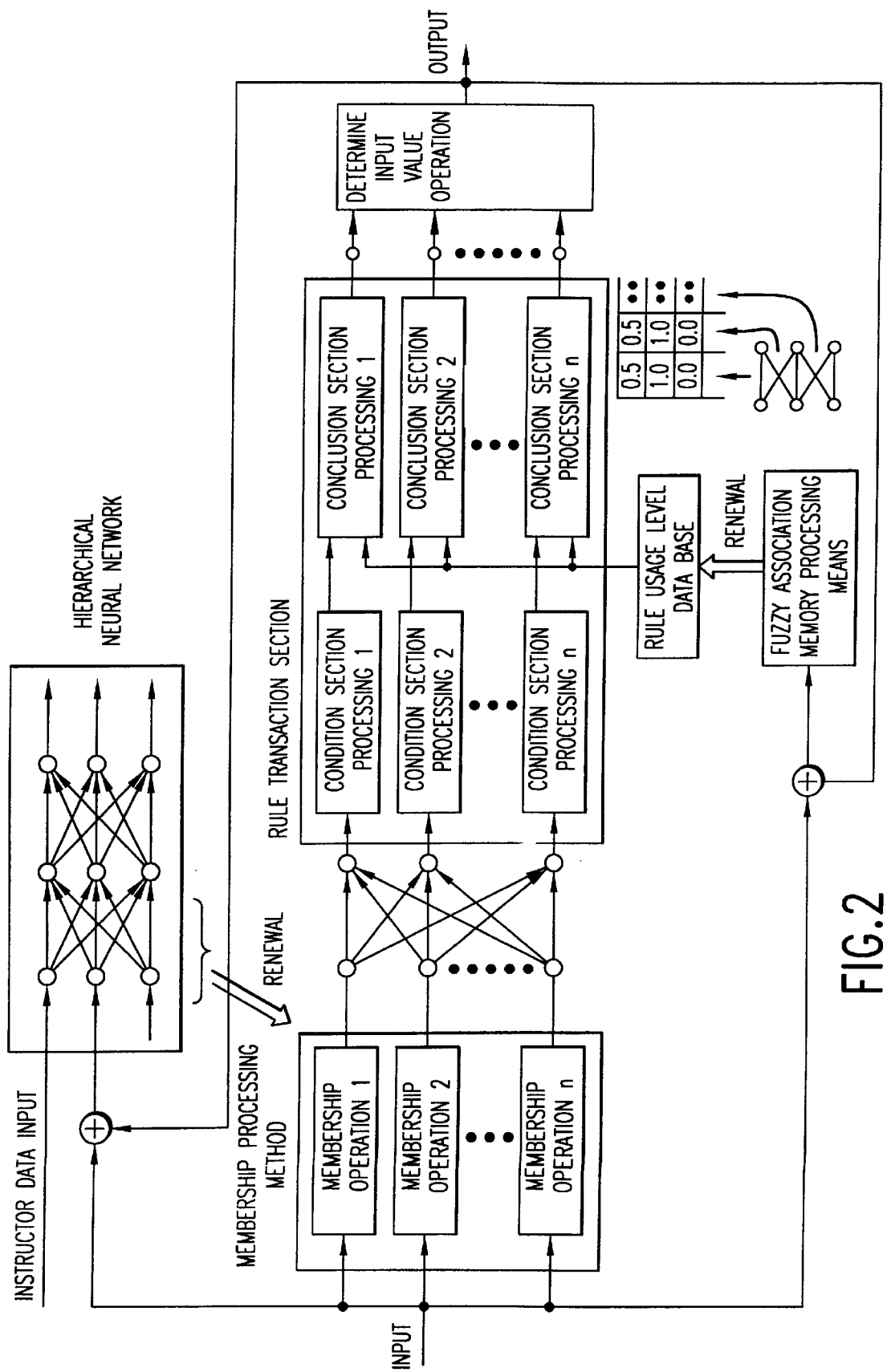
FIG. 2 illustrates a fuzzy processing employed in the present invention.

FIG. 2 shows an embodiment of fuzzy processing employed in the present invention. In this figure, data values employed in the membership operations (1) to (n) are updated by a hierarchical (multilayer) neural network for re-writing data values. In a rule processor, fuzzy associative memory processing means judges whether or not the fuzzy rule is valid in order to constitute a fuzzy filter which effects fuzzy inference. The detailed operation of various parts will be explained subsequently.

The color area information values L, a and b, represented by the L*a*b* color specification system, enter the color area converting means 6. The color area converting means 6 is made up of extracting means 2, discriminating means 3 and mapping means 4.

In the extracting means 2, the information values representing the color gamut 14 of the L*a*b* color specification system, pre-set for each input device, are compared to the information values representing the color gamut 15 of the L*a*b* color specification system, pre-set for each output device, and the portion of the wider color gamut not belonging to and transgressing the narrower color gamut, that is the differential color gamut, is extracted by extracting means 16 using the fourth fuzzy processing. Meanwhile, it is preferred in a reproduction color gamut 14 for an input device 14 and a reproduction color gamut 15 for an output device that color gamuts associated with the input and output devices connected to the present device be previously selected by control signal applied from outside.

The information values of the differential color gamut enter the discriminating means 3. The differential color gamut is divided, based upon pre-set plural memory colors 17, into e.g. 10 partial color areas by a partial color area extracting (sic dividing) means 18, from one color component to another. The information values of one or more representative points A in each partial color area are stored in memory means 19.

Of the reproduction color gamut 14 of the input device 14 and the reproduction color gamut 15 of the output device, the narrower color gamut is similarly divided into plural color areas, based upon the memory colors 17, from one color component to another. The information values of one or more representative points B of these partial color areas are stored in memory means 22.

These representative points A and B enter the mapping means 4. The mapping means 4 effects mapping of associating the respective representative points A in the portion of the color area of the input signal to the present device which belongs to the differential color gamut to the respective representative points B in the narrower color gamut in a 1-for-1 relationship from one color component to another with the aid of first fuzzy processing.

In FIG. 1, it is possible for the user to selectively set the color information of mutually associated representative points of the two color gamuts for the memory means 19, 22 for the representative points A and B by representative color point selecting means 26 whenever the necessity arises. The setting may also be done via other external devices, such as memories.

Preferably, aesthetic adjustment or correction may be carried out by having reference to language representing colors, adjustment mode or data specifying respective color areas, or by having reference to the effects of aesthetic correction, by color samples, color routes or liking of representative points associated with respective color areas extracted by psychological memory color categories on an operated image displayed on a variety of input/output devices or monitors such as an operating panel of a copying machine as represented by the memory means 19 or 22 for representative points A and B.

Since the differential color gamut is pre-set from one input/output device to another by the reproduction color gamut 14 for the input device and the reproduction color gamut 15 for the output device, if the respective representative points A of the portion of the color area of the input signal belonging to the differential color gamut are mapped, the respective partial color areas of the differential color gamuts in the input signal can be mapped to the respective partial color areas of the narrower color gamut for correcting the color reproduction gamut.

The color area information values L', a' and b' of the corrected color reproduction gamut enter the output converting means 5 where third fuzzy processing is carried out and thereby converted into R, G and B signals of the image signals which are outputted via an output interface 24. On the other hand, if signals of the L*a*b* color specification system are outputted, the color area information values L', a' and b' are outputted via an output interface 25 without entering the output converting means 5.

Figure 3:
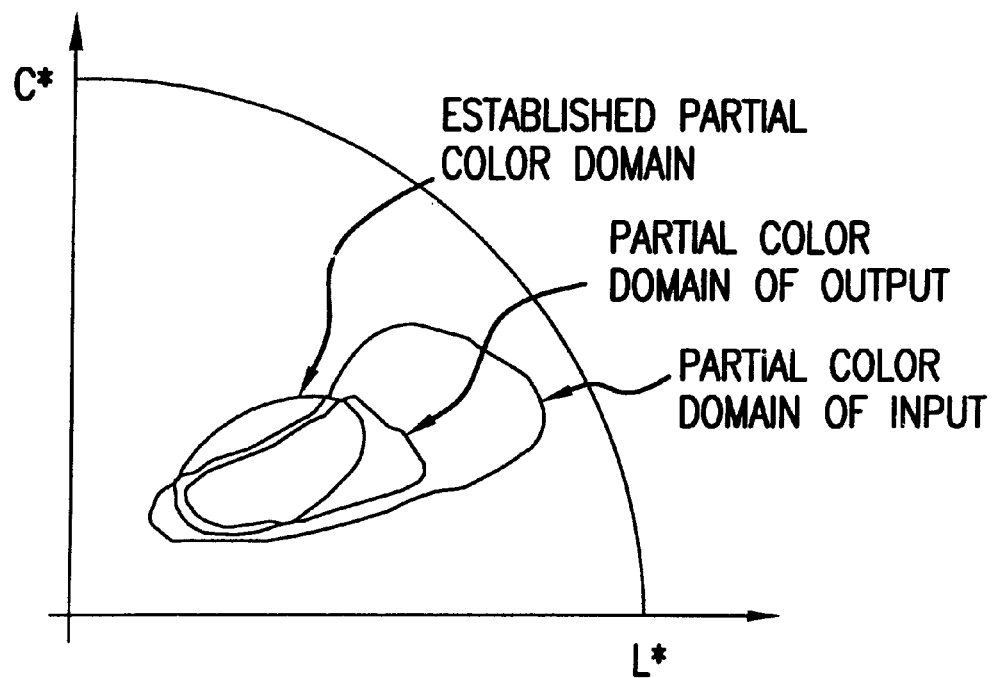
FIG. 3 illustrates a partial color area corrected by the embodiment of the present invention.

FIG. 3 shows a partial color area of an input image, a pre-set partial color area and the color area in the L*a*b* color specification system of the partial color area of the output corrected by the present invention.

The color gamut of one of the reproduction color gamut 14 of the input device and the reproduction color gamut 15 of the output device is corrected by color components of the other color gamut. Thus, if the reproduction color gamut 14 of the input device is narrower than the reproduction color gamut 15 of the output device, the reproduction color gamut 14 of the input device is corrected and, if otherwise, the reproduction color gamut 15 of the output device is corrected. Thus it may appear that it is indefinite which of the color areas will be outputted. However, since in general the color monitor is wider in the color gamut and a color printer is narrower in the color gamut, the output color gamut can be set by changing the pre-set color gamut for each input/output image device, thus assuring constant color reproducibility.

Figure 4A:
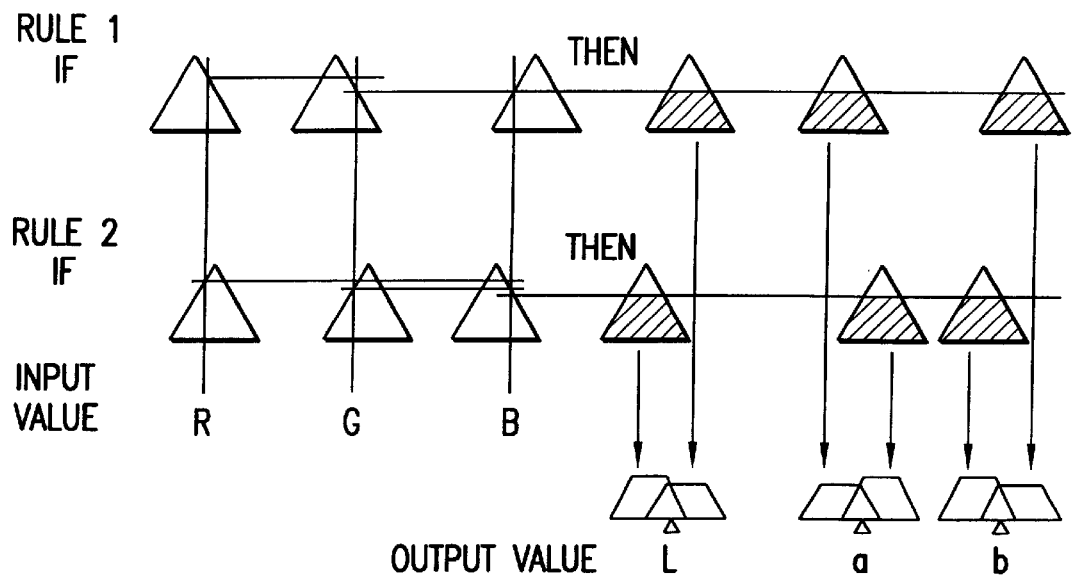
FIGS. 4A and B illustrate a fuzzy filtering system and membership functions of the fuzzy filtering system, respectively.

FIG. 4A illustrates the operation of the fuzzy filtering system employed in the embodiment of the present invention. For constituting the fuzzy filter, several membership functions are formulated for all of input observed values and output values of the fuzzy filter as shown in FIG. 3B (sic FIG. 4B). In the present embodiment, the input and output values are RGB, YMC, L*a*b* or XYZ signal values.

Figure 4B:
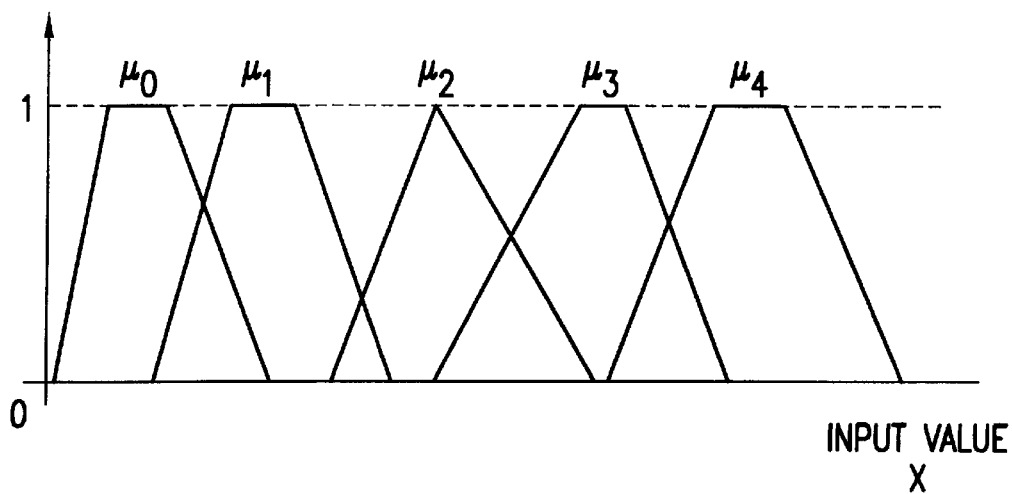

In FIG. 4B, five membership functions are defined and given the names $\mu_0$ to $\mu_4$. As for the input values defined on an input variable, among these membership functions, grade values belonging to the closed domain [0, 1] on the ordinate are calculated if a particular observed value Xi is afforded. These are designated for example as $\mu_0$ (152) or $\mu_1$ (152).

Then, using these membership functions, conversion rules for filter processing are formulated. This is described as a production rule having the form represented by the following equation IF $x_0$ IS $\mu_i^{x_0}$ AND $x_1$ IS $\mu_j^{x_1}$ AND $x_2$ IS $\mu_k^{x_2}$ THEN $y_0$ IS $\mu_l^{y_0}$, $y_1$ IS $\mu_m^{y_1}$, $y_2$ IS $\mu_n^{y_2}$ (2)

In the above equation, $x_0$, $x_1$ and $x_2$ are input variables of the fuzzy filter, $y_0$, $y_1$ and $y_2$ are output variables of the fuzzy filter, and i, j, k, l, m and n are identifiers of the membership functions.

In an actual system, a plurality of this form of production rules are used. Of the rules described with this form, those stated in the key word IF to the key word THEN and downstream of the key word THEN are termed condition parts and conclusion parts of the rules, respectively. In the actual processing sequence of the rules, an objective of processing of the rule condition parts is to find the degree α of firing of the rule found by the following:

$$\alpha = \min (\mu_i^{x_0}(x_0), \mu_j^{x_1}(x_1), \mu_k^{x_2}(x_2)) \quad (3)$$

The processing of the rule conclusion part is completed by finding, from the membership function stated in the conclusion part, the center of gravity values $G_0$, $G_1$ and $G_2$ as defined by the following equations:

$$G_0 = \frac{\sum_{r=1}^{R} \int \alpha_r \cdot y_0 \mu_l^{y_0}(y_0) d y}{\sum_{r=1}^{R} \int \alpha_r \cdot \mu_l^{y_0}(y_0) d y_0} \quad (4)$$

$$G_1 = \frac{\sum_{r=1}^{R} \int \alpha_r \cdot y_1 \mu_m^{y_1}(y_1) d y}{\sum_{r=1}^{R} \int \alpha_r \cdot \mu_m^{y_1}(y_1) d y_1} \quad (5)$$

$$G_2 = \frac{\sum_{r=1}^{R} \int \alpha_r \cdot y_2 \mu_n^{y_2}(y_2) d y}{\sum_{r=1}^{R} \int \alpha_r \cdot \mu_n^{y_2}(y_2) d y_2} \quad (6)$$

using α found in the equation 3. In the equations to 6, r is an identification number of the production rule and R is the total number of the production rules. "–" is the t-norm or s-norm operation in the fuzzy logic. For this, MIN operation or arithmetic product is employed. Σ operation usually means repetition of the arithmetic sum operations. However, repetition of the Max operations may also be employed. FIG. 4A shows the above processing in a simplified manner.

If the fuzzy filter system, for example, is employed for mapping employed in the present embodiment, mapping is carried out by the following steps.

As the first step, the partial color area B1 in the color gamut is set based upon the stored color, such as blue as recognized as the sky color. Also the representative points of the respective partial color areas are defined. One or plural such representative points in the respective color areas may be employed.

A partial color area B2 in the narrower color gamut corresponding to each output device may similarly be set based upon the stored color, and the representative points of the respective partial color areas are defined, so that the difference in color reproducibility existing between various output devices, such as between the monitor device and the printer or between respective printers may be lowered.

Figure 5:
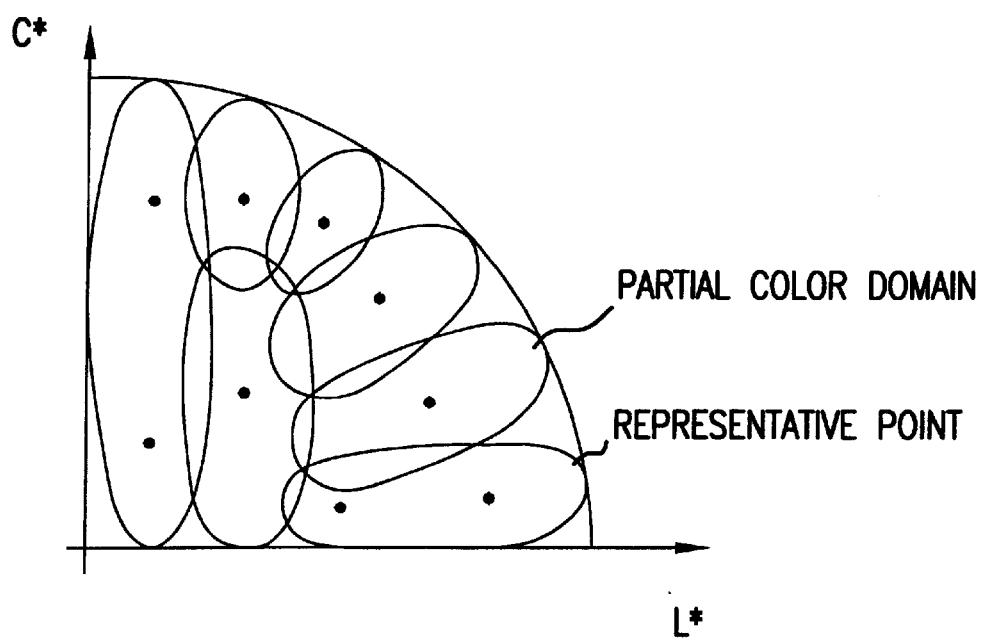
FIG. 5 illustrates partial color areas and representative points when carrying out mapping by a fuzzy filtering system.

FIG. 5 shows these partial color areas and the representative points. In this manner, all partial color areas are combined so that the total color areas of the input and output devices are covered with these partial color areas.

As for the data of these color representative points, the representative points of the partial color area B1 of a given color gamut is set to a three-dimensional vector $V_{Ii}=(L_{Ii}, a_{Ii}, b_{Ii})$, while the representative points of the partial color area B2 of another color gamut is set to $V_{Oi}=(L_{Oi}, a_{Oi}, b_{Oi})$ where i=0 to imax, imax being the total number of representative points operating as samples.

Figure 6:
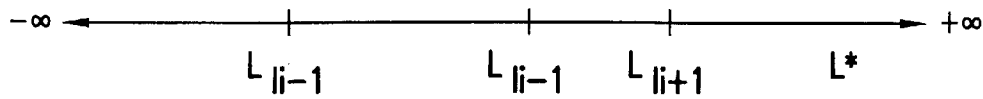
FIG. 6 illustrates scaler values of the representative points in FIG. 5.
Figure 7A:
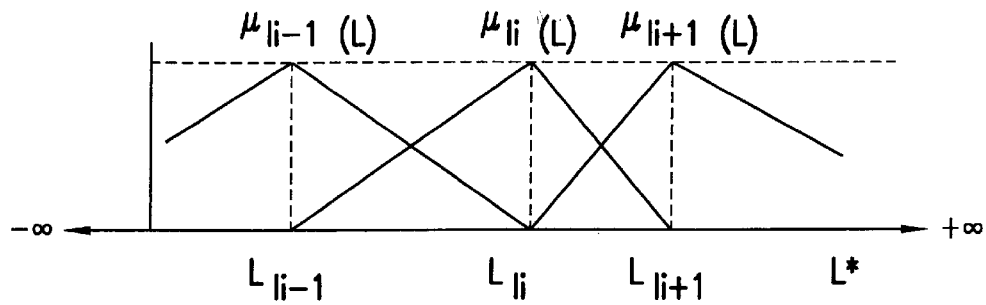
FIGS. 7A and 7B illustrate triangular-shaped and hanging bell-shaped membership functions corresponding to FIG. 6, respectively.
Figure 7B:
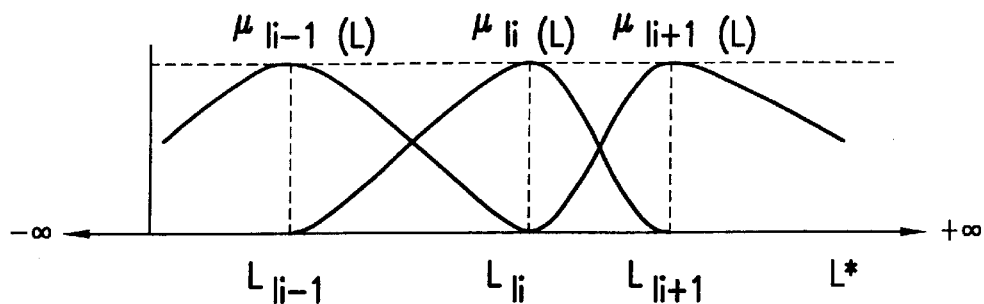

As the second step, scaler values constituting the vectors in $V_{Ii}$ and $V_{Oi}$, such as $L_{Ii}$, are individually collected and classified, as shown in FIG. 6. The membership functions are constructed as shown in FIGS. 7A and 7B. FIGS. 7A and 7B show a triangular-shaped function and a hanging bell-shaped function, respectively. The membership functions are defined as $\mu_{Ii}(L)$.

It is a frequent occurrence that, if the input side is a scanner and the output side is a printer, the color gamut of the output side printer becomes narrow, whereas, if the input side is a scanner and the output side is a monitor, the color gamut of the input side scanner becomes narrow. In the present embodiment, the output side is of the narrower color gamut, and each representative point of this partial color area B2 is set to $V_{Oi}$. On the other hand, each representative point of the partial color area B1 contained in the color area extracted by the extracting means 2 is set to $V_{Ii}$.

As the third step, if, from the above membership functions, the representative point $V_I$ of the color gamut of the input value is contained in the representative point $V_{Ii}$, as shown by the following equation, imax production rules, having the output value $V_O$ as the representative point $V_{Oi}$, are prepared.

IF $V_I$ IS $V_{Ii}$ THEN $V_O$ IS $V_{Oi}$

Figure 8A:
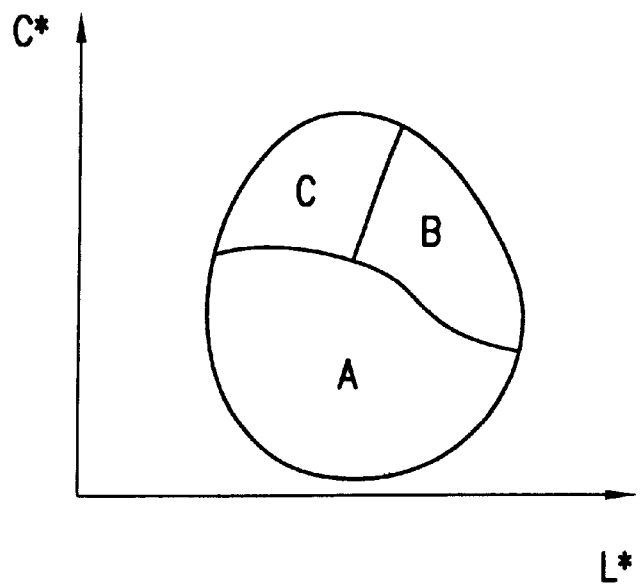
FIGS. 8A and 8B illustrate color gamuts of an input image and a re-arranged output image, respectively.
Figure 8B:
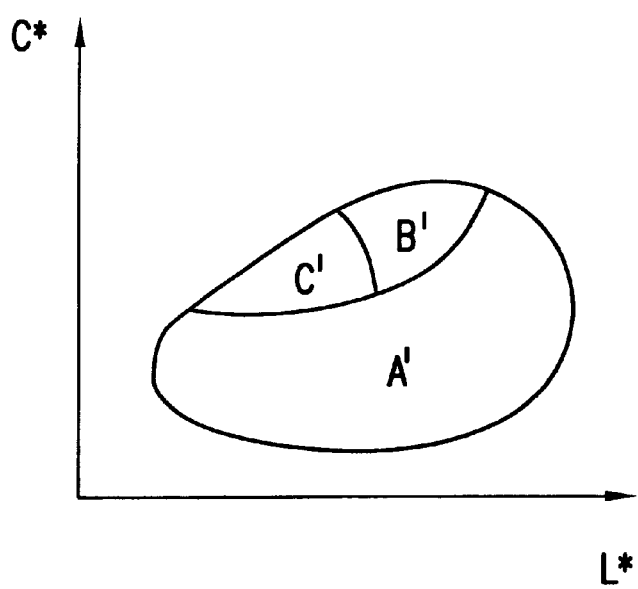

As the fourth step, by carrying out the processing explained in connection with the fuzzy filtering system on the above-mentioned production rule, the re-arranging processing of the color information shown in FIG. 8 is realized. FIGS. 8A and 8B illustrate a color gamut of the input device and a re-arranged color gamut of the output device, respectively.

The neuro processing and the processing combined from fuzzy and neuro feasible with the present invention will now be explained.

Figure 9:
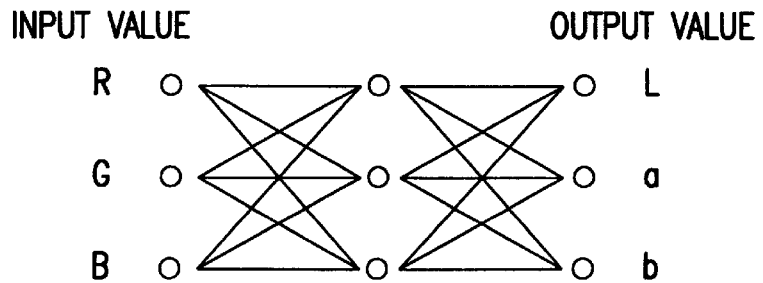
FIG. 9 illustrates a hierarchical neural network.
Figure 10:
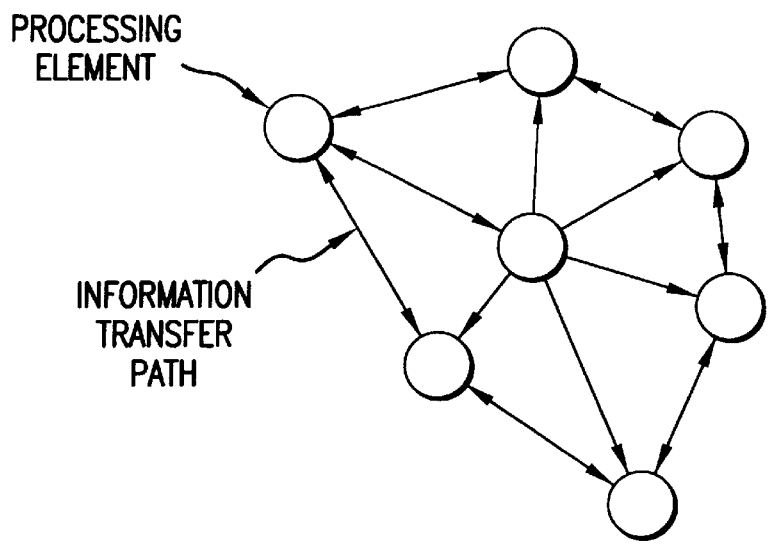
FIG. 10 illustrates the construction of a basic neural network.

FIGS. 9 and 10 show a hierarchical neural network system and the constitution of a basic neural network, respectively. The basic neural network is constituted by processing elements (PEs) corresponding to simplified cranial neurons represented by circles and information access paths interconnecting the PEs, as shown in FIG. 10.

Figure 11:
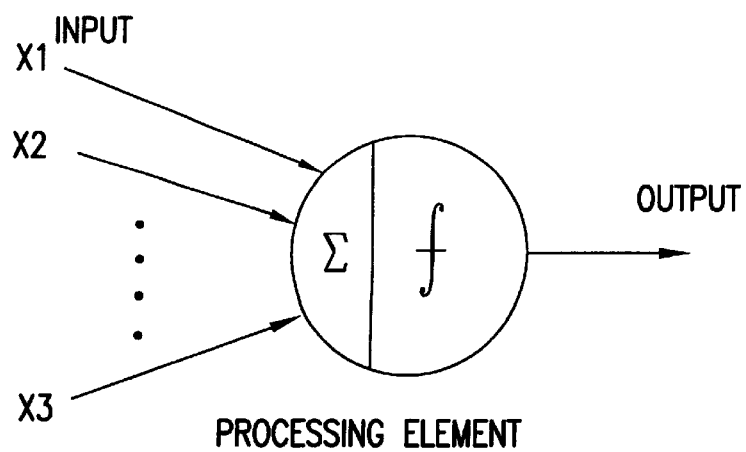
FIG. 11 illustrates a PE operation.
Figure 12:
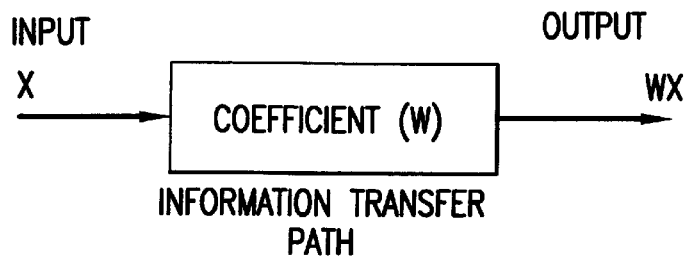
FIG. 12 illustrates the operation of an information access path.
Figure 13A:
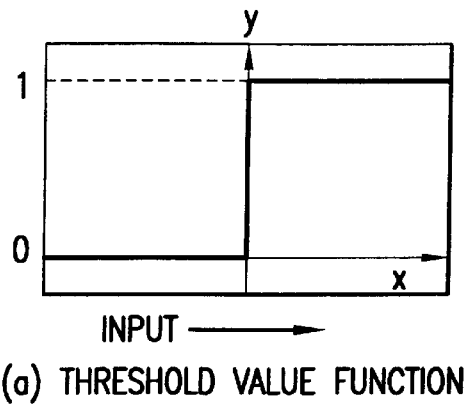
FIGS. 13A and 13B illustrate a threshold function and a sigmoid function employed as a PE transfer function, respectively.
Figure 13B:
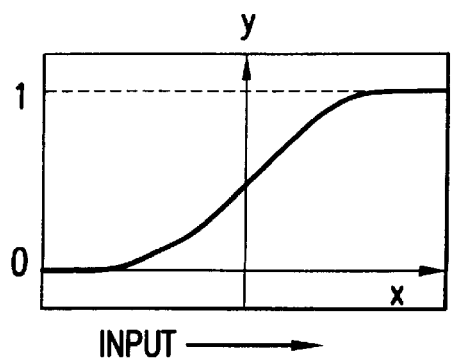

The PEs and the information access paths may generally be modelled as shown in FIGS. 11 and 12, respectively. The PEs process the sum of input signals via several access paths using a pre-set transfer function and output a sole value in each of access paths. Among the functions applied for this case are a threshold function as shown in FIG. 13A or a sigmoid function as shown in FIG. 13B. A probability model or a chaos model, which is a sort of a non-linear model, may also be employed. The sigmoid function f(x) is represented by the following equation:

$$f(x) = \frac{1}{1+\exp\left\{\left(-2\sum_{i=1}^{n} x_i\right)/u_0\right\}} \quad (7)$$

where $u_0$ is a constant.

As for the behavior of the information access path, a signal received at an input side (which frequently is a value comprised within a domain of [0, 1]), is multiplied by a coefficient (usually termed a weight) pre-employed for each of the access paths, and the resulting product is sent to the PE connected to the output side.

In the neural network, an arithmetic-logical operation termed the neural network learning, is frequently employed. The neural network learning means applying several sample data when it is not clear at the outset how the initial state of the neural network is set and the behavior of the neural network is adjusted to a more preferable state. Such learning is actually realized by adjusting the coefficients applied to the information access paths among the PEs. According to the present invention, the information such as RGB, YMCK or L*a*b* is utilized as the learning data for learning.

The learning algorithm of the neural network differs from one neural network model employed to another. It may be roughly classified into a supervised learning algorithm with a supervisor and that without an unsupervised learning algorithm supervisor. In order for the neural network to learn, a pre-set evaluation standard is required for transition to a better state. If this is applied for each learning, it is a supervised learning. If the evaluation standard is afforded to the neural network itself and external evaluation signals are not applied, the learning is an unsupervised learning.

The back-propagation, as the supervised learning algorithm, and the competitive learning algorithm, as the unsupervised learning algorithm, are hereinafter explained.

The hierarchical neural network, which is also termed a perceptron type, or a Rosenblatt type neural network, is an appellation of the learning algorithm employed for the neural network. The hierarchical neural network is also termed a back-propagation.

Figure 14:
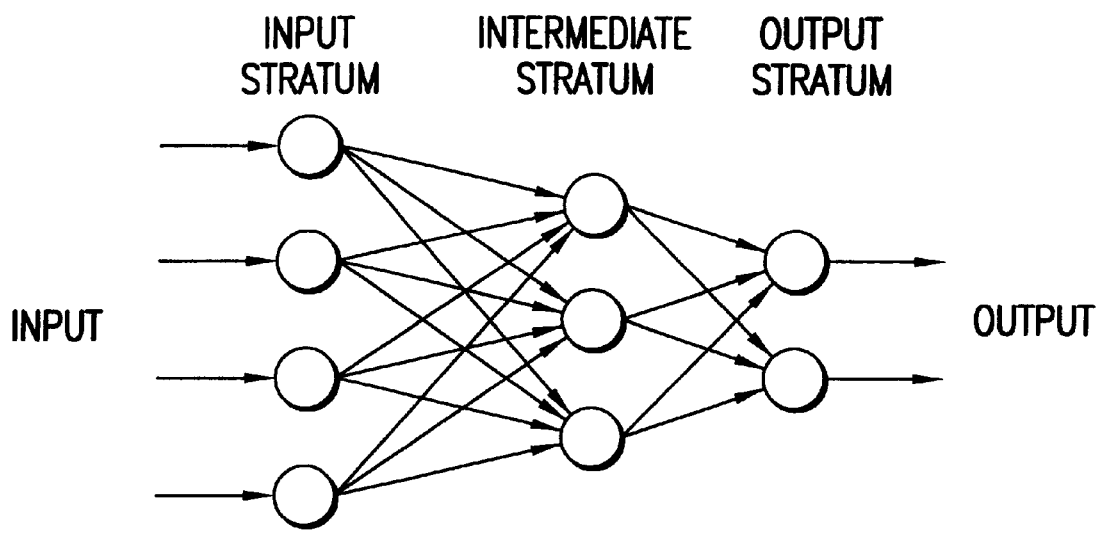
FIG. 14 illustrates a Rosenblatt type neural network.

As an example of the neural network of the type including the learning algorithm, the Rosenblatt type neural network is shown in FIG. 14. The network is of the hierarchical structure as shown and takes some signal from outside to sequentially transmit the signal through an intermediate layer to an output layer from which some form of the information is outputted to outside. Thus the network operates as a sort of a filter. Although in FIG. 14 only one intermediate layer is shown, plural intermediate layers may optionally be employed.

As for the operation of the PEs in respective layers, the sigmoid function f is given by the following equation:

$$P_{ij} = f\left(\sum_j P_{i-1j} w_{i-1j}\right) \quad (8)$$

where $p_{ij}$ is an output value of the jth PE of the ith layer.

If i=0, that is, if desired to find the output value of the PE of the input layer, an input value applied from outside is used with setting of $P_{i-ij}$.

As the algorithm employed for learning of the neural network, the supervised learning algorithm, that is the learning algorithm in which the neural network operation is adjusted based upon the applied supervising data, is generally employed. This is termed back-propagation, the processing sequence of which is shown below.

As the first step, a connection coefficient of the neural network is initialized by a suitable method, as with the use of a random number.

As the second step, an output value for a sample input value is calculated by the above equation (8). As the third step, an error to a connection path from each PE of the output layer to that of the intermediate layer is calculated from the output value calculated in the second step and the output value of the sample data applied as a supervising data. The equation for calculation follows:

$$\delta_i = \frac{2}{u_0}(P_i - T_i)P_i(1 - P_i) \tag{9}$$

$P_i$ is an output value of each PE of the output layer and Ti is a teacher signal applied from outside. $u_0$ is a constant used for defining the sigmoid function.

As the fourth step, an error to a connection path from each PE of the intermediate layer to that of the input layer is calculated from the value of the intermediate layer calculated in the second step and the error of each PE of the output layer calculated in the third step. This is shown by the following equation:

$$\sigma_j = \sum_j \delta_{ij} w_{ij} P_j (1 - P_j) \tag{10}$$

As the fifth step, the coefficient of the path between the PEs is corrected using errors for each PE as found in the third and fourth steps. This is shown by the following equation where α is an optional constant termed a learning constant.

$$w_{ij} = w_{ij} + \alpha \sigma_i P_j \tag{11}$$

$$w_{ij} = w_{ij} + \alpha \sigma_j P_j \tag{12}$$

As the sixth step, the steps described above are repeated a required number of times.

Figure 15:
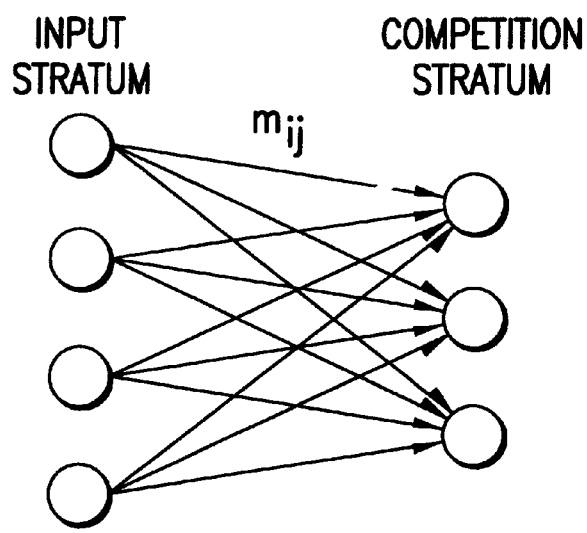
FIG. 15 illustrates a neural network employed in competitive learning.

The competitive learning is now explained. In distinction from the Rosenblatt type neural network, the neural network employing competitive learning is a neural network not employing teacher signals. FIG. 15 shows a two-layered model employing an input layer and an output layer.

In distinction from the Rosenblatt type neural network in which an input signal is processed in some form to output a signal in the output layer, the neural network of the type stated above grasps the information access path existing between the input and output layers as being a vector specifying a point in the vector space in which there exist input/output signals, and re-writes the vector present at a position closest to the applied learning data to a closer vector.

The result is that, after sufficient learning by the neural network of this sort, the neural network vectors are concentrated in the vicinity of the vector space in which more sample data vectors are concentrated. Each PE of the output layer is able to divide the vector space in accordance with the sample data.

There are several versions of this system of the learning algorithm. The operational steps in case of using the unsupervided competitive learning (UCL) system, a supervised competitive learning (SCL) system and a differential competitive learning (DCL) system are herein explained. In the following explanation, t, m, x, x(t) and y(t) denote time, vector between input and output layers, sample data, firing degree of the PE of the input vector and the firing degree of the PE of the output layer, respectively.

As the first step, initialization is done with, for example, $m_j(0) = x(i)$. As the second step, a winner PE having $m_j(t)$ is searched in accordance with the following equation:

$$\|m_j(t) - x(t)\| = \min_i \|m_i(t) - x(t)\| \tag{13}$$

As the third step, the vector $m_j(t)$ of the winning PE is updated using any one of the systems UCL, SCL and DCL. As the fourth step, the above steps are repeated until all sample data have been read.

If $m_j(t)$ is updated at the third step, and $m_j(t+1)$ is found, the following equation is applied, if the UCL system is employed.

$$m_j(t+1) = m_j(t) + c_t[(x(t) - m_j(t)] \tag{14}$$

Other vectors are not updated.
On the other hand, $m_i(t+1)$ becomes $m_i(t+1) = m_i(t)$.
The following equation is applied, if the DCL system is employed.

$$m_j(t+1) = c_t \gamma_j(x(t)) [x(t) - m_j(t)] \tag{15}$$

Other vectors are not updated.
On the other hand, $m_i(t+1)$ becomes $m_i(t+1) = m_i(t)$.
The following equation is applied, if the DCL system is employed.

$$m_j(t+1) = m_j(t) + c_t \delta S_j(y_j(t))[S(x(t)) - m_j(t)] \tag{16}$$

Other vectors are not updated.
On the other hand, $m_i(t+1)$ becomes $m_i(t+1) = m_i(t)$.
In the above equation, undefined symbols and functions are as follows:

$$S_j(y_j) = \frac{1}{1 + e^{-cy_j}} \tag{17}$$

$$S_i(x_i) = \frac{2}{1 + e^{-cx_j}} - 1 \tag{18}$$

$$\delta S_j(y_j(t)) = sgn[S_j(y_j(t+1)) - S_j(y_j(t))] \tag{19}$$

$$sgn(x) = \begin{cases} 1 & \text{if } x > 0 \\ 0 & \text{if } x = 0 \\ -1 & \text{if } x < 0 \end{cases} \tag{20}$$

$$y_j(t+1) = y_j(t) + \sum_i^n S_i(x_i(t))m_{ij}(t) + \sum_k^p S_k(y_k(t))w_{kj} \tag{21}$$

$$S(x)m_j = \|S(x)\|\|m_j\|\cos(S(x), m_j) \tag{22}$$

$$W = \begin{bmatrix} +2 & -1 & \cdots & -1 \\ -1 & +2 & \cdots & -1 \\ & & \vdots & \\ -1 & -1 & \cdots & +2 \end{bmatrix} \tag{23}$$

FIGS. 16 to 21 show a neuro-fuzzy system combined from the fuzzy filter system and the hierarchical neural network system.

Figure 16:
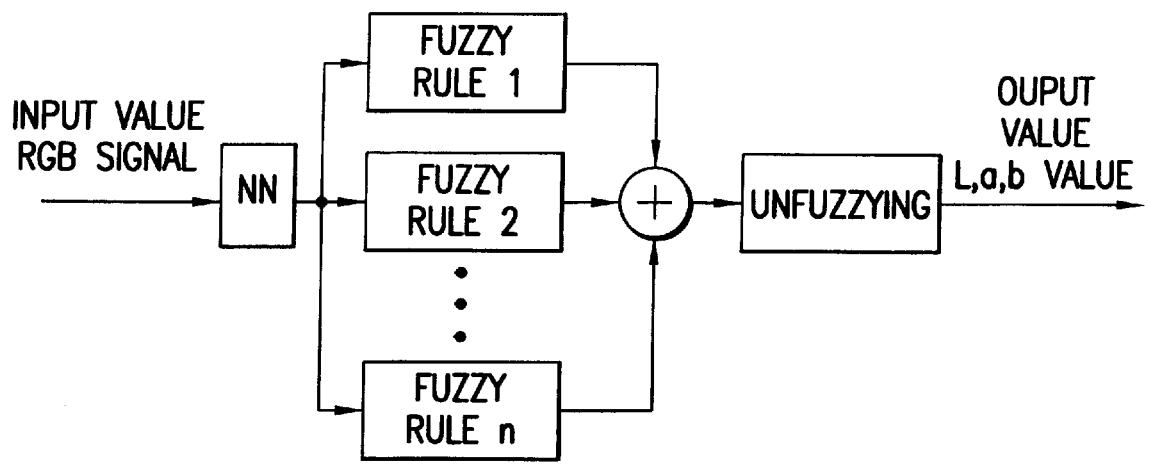
FIG. 16 is a block diagram showing a neuro fuzzy system for calculating the antecedent condition part membership function with the aid of the neural network.

FIG. 16 shows a system in which the neural network is employed for calculating the antecedent condition part membership function.

Figure 17:
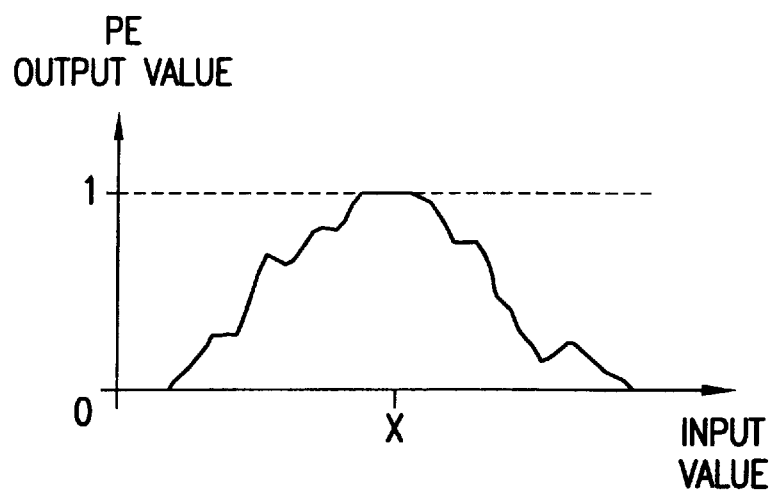
FIG. 17 illustrates the output distribution of the PE for learning of outputting "1" for a value X.

If, in FIG. 16, the neural network is constituted using the above-mentioned back-propagation method, and learning is made in such a manner that outputs "1" and "0" will be issued from the output layer, in fact, as shown in FIG. 17, an output close to "1" is indicated in the vicinity of a value "x".

The combined system of the neural network and the fuzzy filter shown in FIG. 16 employs this distribution in substitution for $\mu(x)$ in the processing for the condition part of the inference in the fuzzy filter.

Figure 18:
FIG. 18 is a block diagram showing a neuro-fuzzy system for pre-correction of the input information to the fuzzy filter using a neural network.
Figure 19:
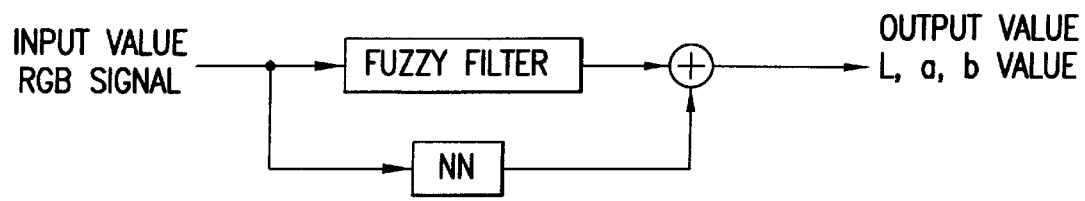
FIG. 19 is a block diagram showing the neuro-fuzzy system employing the combination of the output information of the fuzzy filter and the output information of the neural network.
Figure 20:
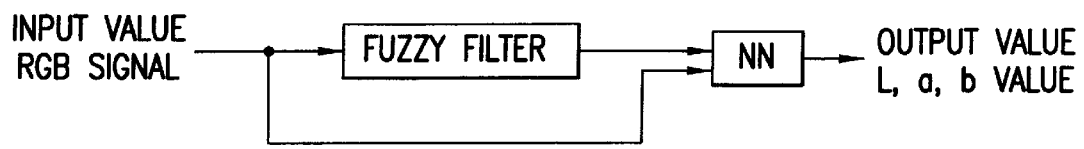
FIG. 20 is a block diagram showing a neuro-fuzzy system for correcting the output information of the fuzzy filter with the neural network.

FIG. 18 shows a system in which the input information to the fuzzy filter is previously corrected using the neural network. FIG. 19 shows a system employing the combination of the output information of the fuzzy filter and the output information of the neural network. FIG. 20 shows a system in which the output information of the fuzzy filter is entered to the neural network for correcting the output information of the fuzzy filter.

Figure 21:
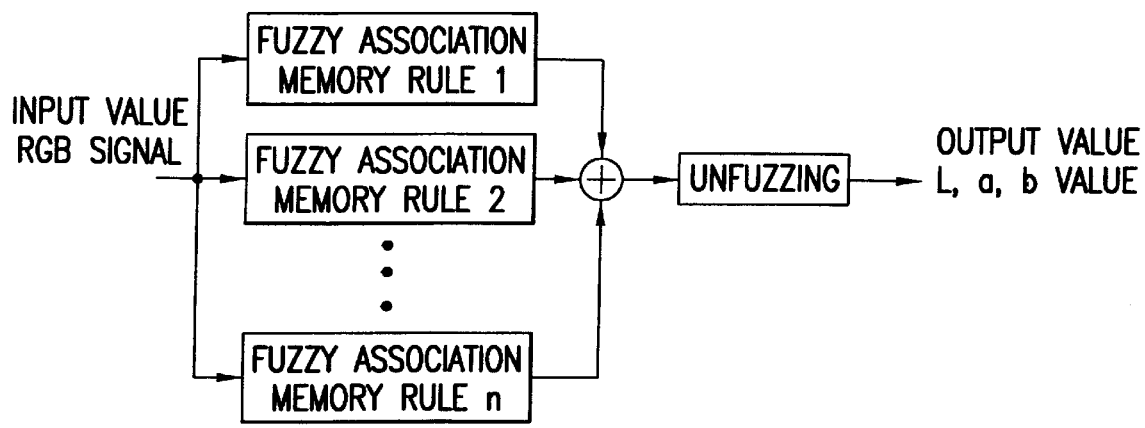
FIG. 21 is a block diagram showing a fuzzy associative memory system.

FIG. 21 is a block diagram showing a fuzzy associative memory system. The PE contained in the competitive layer of the neural network which has completed learning by the competitive learning system holds significant vectors in the connection portion to the PE provided in the input layer.

Figure 22:
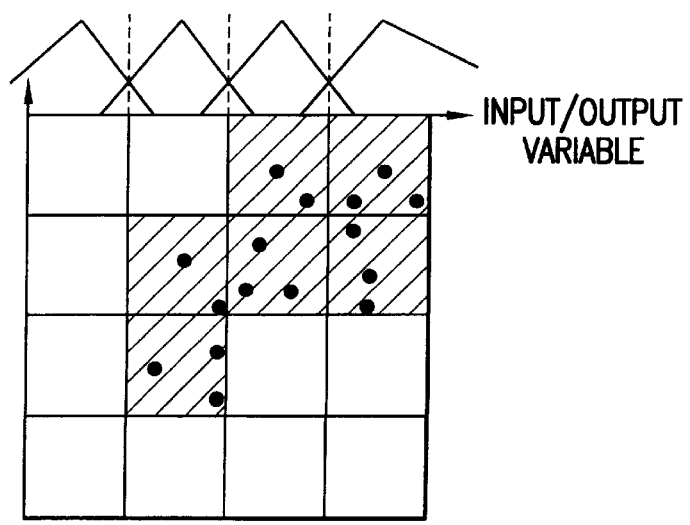
FIG. 22 shows a vector of the PE connection portion on a rule matrix.

FIG. 22 shows these vectors arranged on a rule matrix representing the combination of the fuzzy rules. The black dots in the drawing denote the positions of the vectors owned by the REs (sic PEs) of the competitive layer neural network, while shaded portions denote areas deemed to be valid on the rule matrix.

Figure 23:
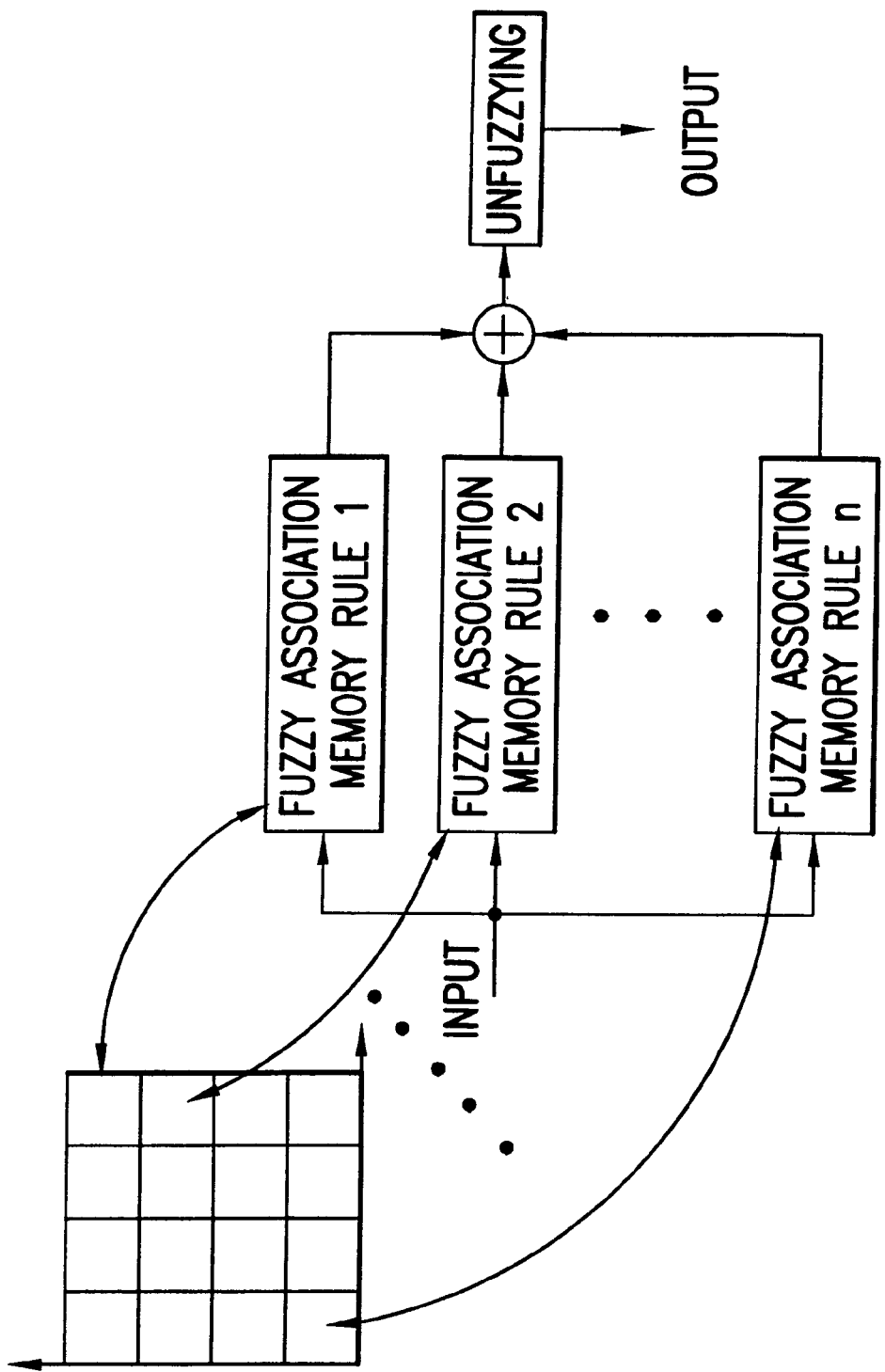
FIG. 23 illustrates the relation between the fuzzy associative rule and the rule matrix.

As shown in FIG. 22, since the vectors are concentrated in the area in which much crucial information is contained in the learning data, a fuzzy filter effecting valid fuzzy inference may be constituted by validating the fuzzy rule corresponding to the rule matrix of such portion and by invalidating other fuzzy rules. This is the constitution of the fuzzy filter by the fuzzy associative memory system shown in FIG. 21. FIG. 23 shows the relation between the fuzzy filter rule and the rule matrix by the fuzzy associative system shown in FIG. 21.

The input image signals in the embodiment of the present invention may also be YMC[K] signals, in addition to the RGB signals. The input image signals and the output image signals may be of the same or different sorts. The chrominance (color difference) signals may also be employed, in addition to the RGB signals, for realizing the same constitution.

Fuzzy processing may also be employed for finding partial color areas in the extracting means 2. The first to fourth fuzzy processing may be the same or different fuzzy processing.

The color image forming and correcting device of the present invention may be built into the image-related system, or enclosed within a variety of image equipments.

The color image forming and correcting device may be built into a variety of systems, such as an image processing system, figure processing system, CAD/CAM system, workstations, printing system, computer system for apparel designing and production or an apparel system. The color image forming and correcting device may also be enclosed in an outputting device, such as a printer, plotter or display, an input device, such as a scanner, CCD cameras, photo CDs, copiers, or devices for converting electronic images into silver salt photographs.

Figure 24:
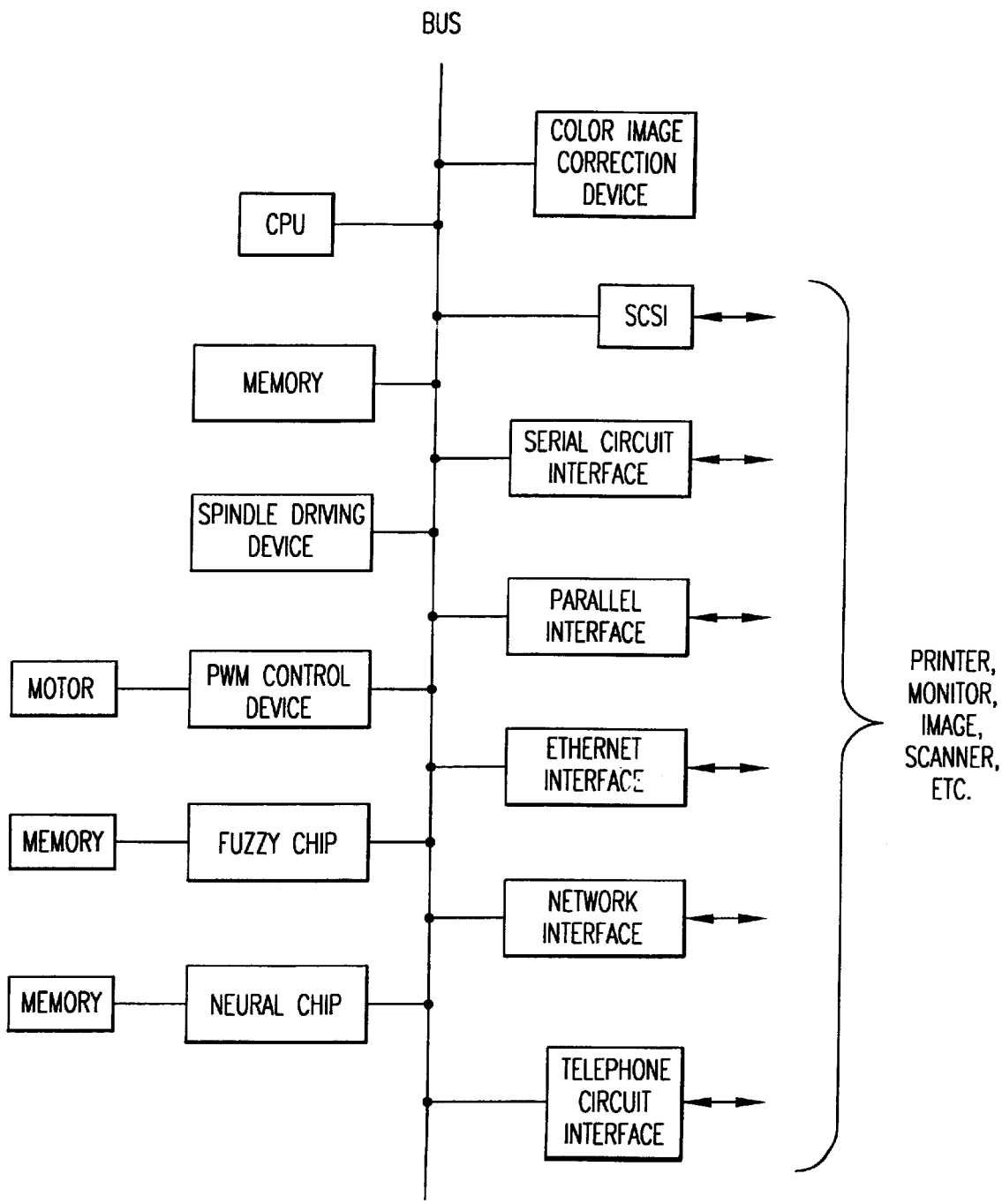
FIG. 24 illustrates a system having a built-in color correction apparatus of the present invention.
Figure 25:
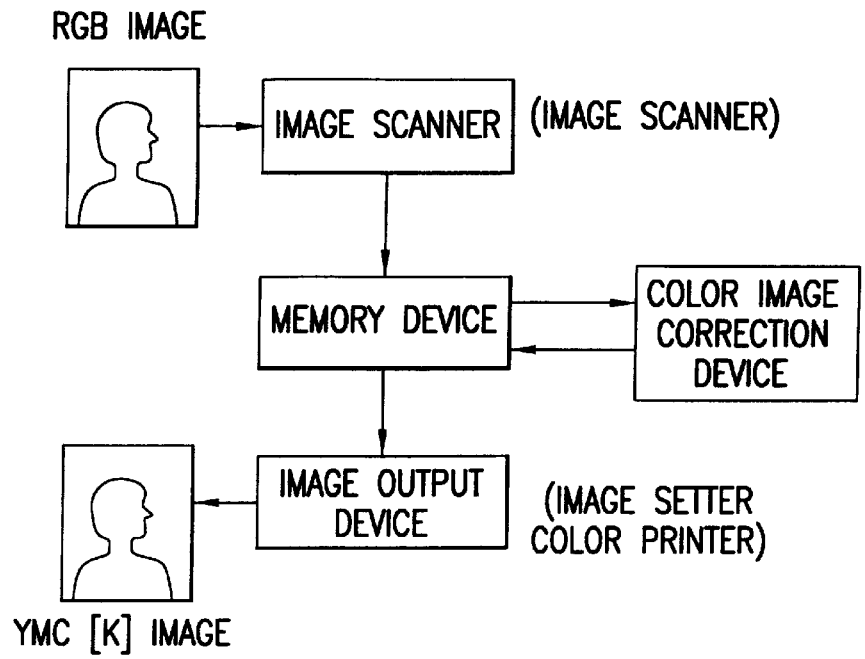
FIG. 25 is a block diagram showing a constitution of application of a color image correcting apparatus according to the present invention.
Figure 26:
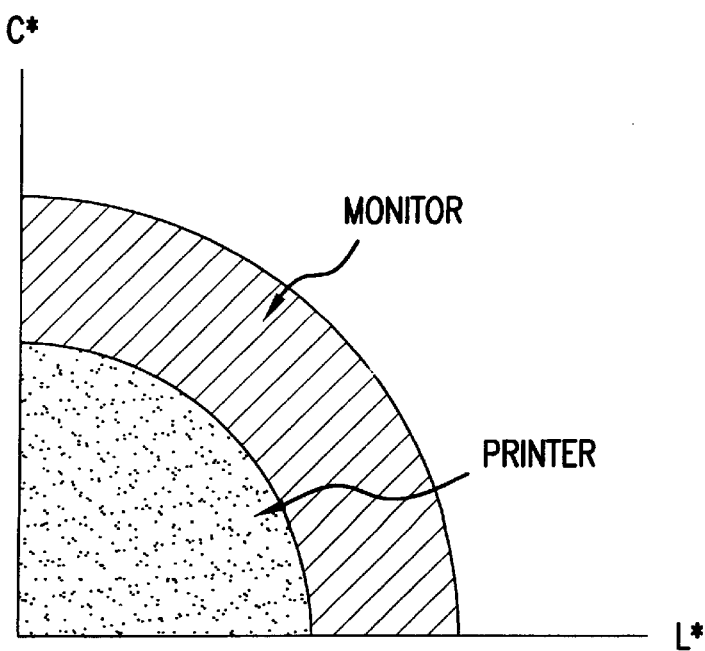
FIG. 26 illustrates color reproduction gamuts.
Figure 27:
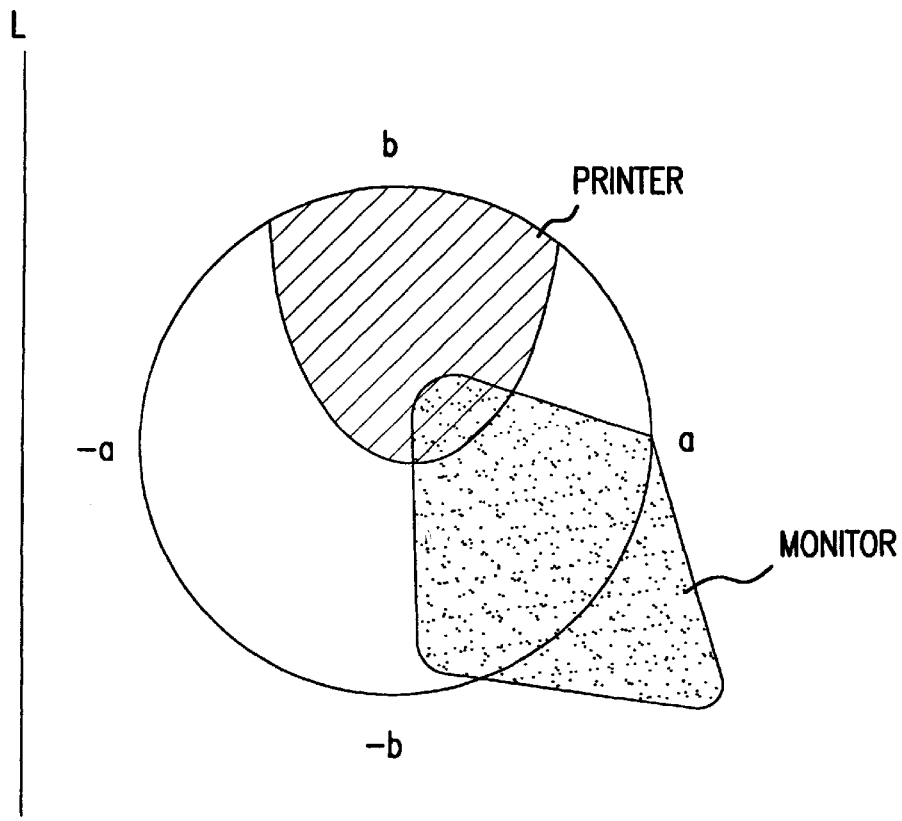
FIG. 27 illustrates color areas L*a*b*.
Figure 28:
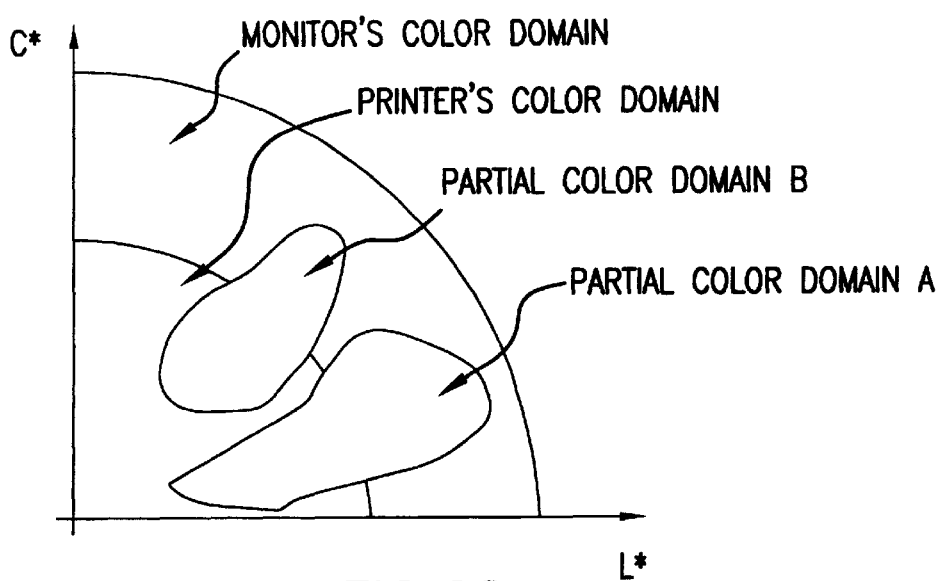
FIG. 28 illustrates distributions of partial color areas.
Figure 29:
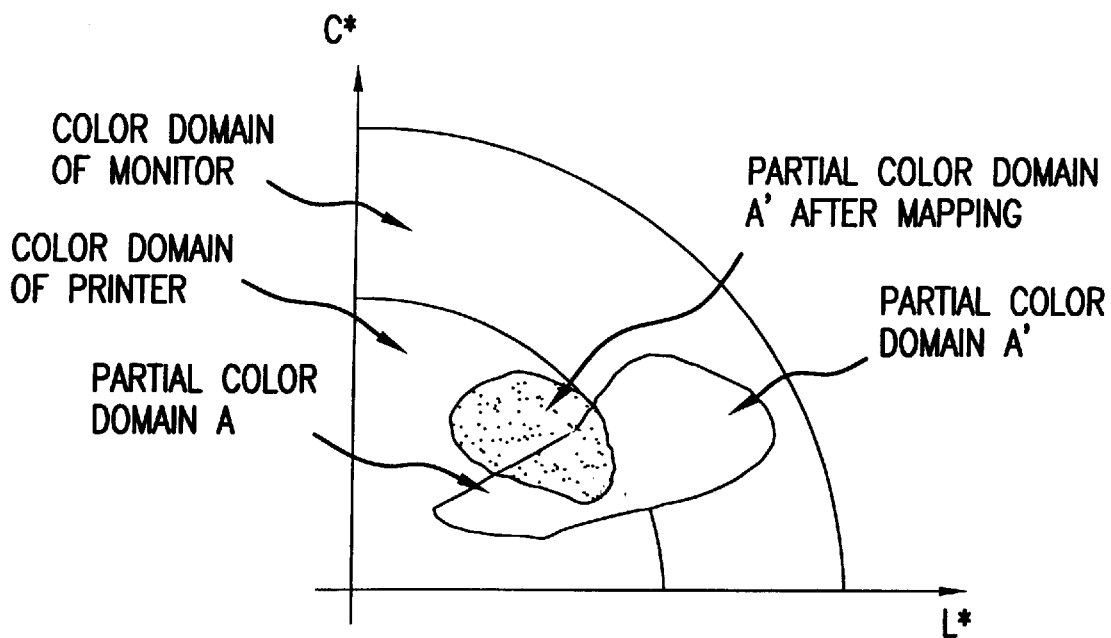
FIG. 29 illustrates a partial color area obtained on mapping a monitor image information to a printer image information.
Figure 30:
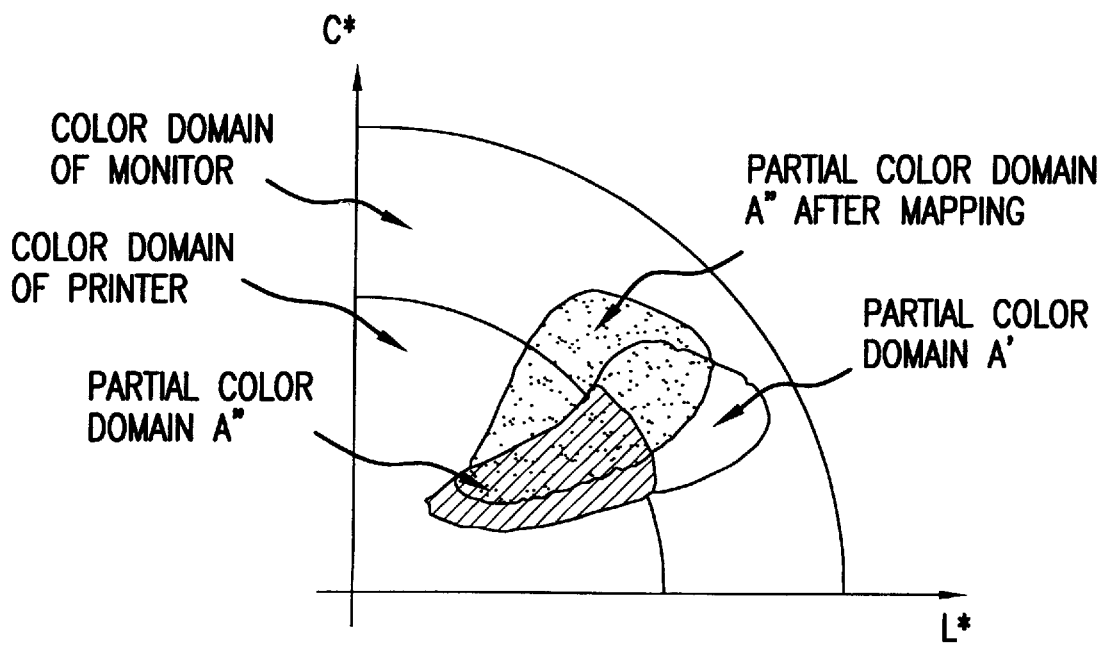
FIG. 30 illustrates a partial color area obtained on mapping a printer image information to a monitor image information.
Figure 31:
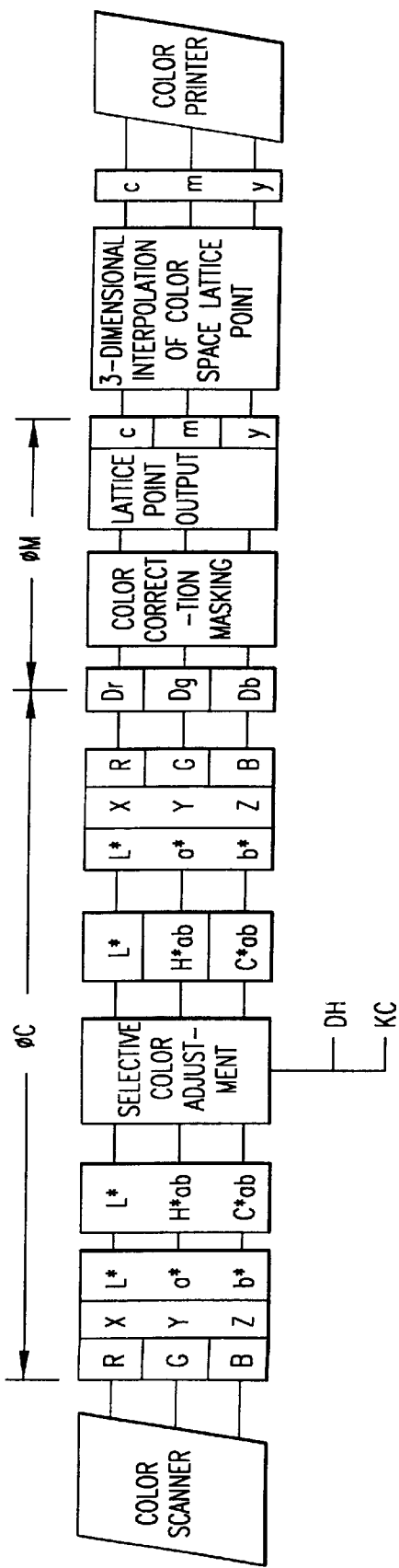
FIG. 31 is a block diagram showing a prior art example.

FIG. 24 shows, in a block diagram, a system in which the color image forming and correcting device of the present invention is incorporated. FIG. 25 shows an applied constitution example of the color image correcting device of the present invention, and consists in a combination of the input/output devices, forming and correcting devices and the memory device. The signals stored in the memory device are outputted after exchanging between the correcting device and the storage device.

The meritorious effect of the present invention are summarized as follows.

With the color image forming and correcting method and device according to the first and second aspects of the present invention, image data correlation is done for each color component using fuzzy processing for conversion of the color gamut by exploiting the fact that, if there is any difference in color reproducibility, different colors are seen by the eyes as being the same color depending upon the relation with the ambient color due to psychological effects. This achieves conversion of color areas in a manner closer to the sense of the human being (claims 1 and 9).

Since the function is provided of converting the image signals, such as video signal, into information values of the coordinate system of the perceptual color space, it becomes possible to handle various signals as input signals to enhance the range of utilization (claims 2 and 10).

In addition, since the color area is divided for respective color components based upon the memory colors of the human being, dividing may be made in a manner closer to the color sense of the human being. The entire color reproduction gamut can be corrected by the divided partial color area being mapped in the vicinity of the pre-set partial color area. The result is that color reproduction closer to the sense of the human being is realized to further reduce the difference in color reproducibility (claims 3 and 11).

By employing various fuzzy operations in combination, and by converting the image signals into values of the coordinate system of the uniform perceptual color space or the coordinate system of the XYZ color specification system according to the CIE recommendations, or by performing the inverse conversion, the processing time may be further reduced for realizing more desirable color images forming and correction (claims 4 to 8 an 12 to 16).

By incorporating the color image correcting apparatus of the present invention in a system including the image device, it becomes possible to correct the difference in color reproducibility present in the system (claim 17). In addition, the entire system may be fuzzy-controlled for reducing the entire processing time (claim 18). By having the color image forming and correcting apparatus of the present invention in various image equipments, corrected color signal may be outputted from the image equipment so that an image equipment is provided which does not produce psychologically alien sense with respect to the color reproducibility (claim 19). The color information of mutually corresponding representative points in the two color gamuts can be selectively set by the user to provide a desirable user interface (claims 20 and 21).

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

We claim:

1. In a method for forming and correcting a color image, wherein the improvement comprises the steps of:

entering an information value representing a color gamut in a coordinate system of a perceptual color space, associating said information value with an information value representing another gamut determined by a pre-set color gamut with the aid of a first fuzzy processing using neural network arithmetic-logical processing from one color component to another for converting, by such association, said color gamut in the coordinate system of the perceptual color space into a converted color gamut which is a prescribed color gamut, wherein the converting into the converted color gamut is done by the steps of:

comparing a pre-set reproduction color gamut of an input device and a pre-set reproduction gamut of an device for extracting a color gamut thereof, dividing said gamut into a plural partial color areas based upon plural pre-set memory colors from one color gamut to another, dividing the reproduction color gamut of the input device or the reproduction color gamut of the output device, whichever is narrower, into plural partial color areas based upon said memory from one color component to another, and associating an information value representing said partial color gamut in said color gamut into an information value representing said partial color gamut in said narrower color gamut according to a color area of the input signal by way of mapping with the aid of said first fuzzy processing and outputting an information value representing the converted color gamut in the coordinate system.

2. The method as defined in claim 1 wherein said color gamut is extracted with the aid of a fourth fuzzy processing.

3. The method as defined in claim 2 wherein said first to fourth fuzzy processing employs at least one of the fuzzy filter arithmetic-logical processing selected from the group consisting of neural network arithmetic-logic processing and a fuzzy associate memory arithmetic-logical processing.

4. An apparatus for forming and correcting a color image comprising, a color gamut converting means configured for entering an information value representing a color gamut in a coordinate system of a perceptual color space, associating said information value with an information value representing an other color gamut determined by a pre-set color gamut with the aid of a first fuzzy processing, selected from fuzzy filter arithmetic-logical processing, neural network arithmetic-logical processing and a fuzzy associated memory arithmetic-logical processing, from one color component to another for converting, by such association, said color gamut in the coordinate system of the perceptual color space into a converted color gamut which is a prescribed color gamut, wherein said color gamut converting means comprises:

extracting means for comparing a pre-set reproduction partial color gamut of an input device and a pre-set reproduction partial color gamut of an output device and extracting a color gamut there of, discriminating means for dividing said color gamut into plural color areas based upon plural pre-set memory colors from one color component to another, dividing the reproduction color gamut of the input device or the reproduction color gamut of the output device, whichever is narrower, into plural partial color areas based upon said memory colors from one color component to another, and mapping means for associating an information value representing the partial color gamut in said color in said color gamut into an information value representing said partial color gamut in said narrower color gamut according to a fuzzy processing means for converting into an information value representing said converted color gamut which is a prescribed color gamut, and outputting means for outputting the information value representing the converted color gamut in the coordinate system.

5. The apparatus as defined in claim 4 wherein said extracting means is extracting said color gamut with the aid of a fourth fuzzy processing means.

6. The apparatus as claimed in claim 5 wherein said first to fourth fuzzy processing means employs at least one of the fuzzy filter arithmetic-logical processing, neural network arithmetic-logical processing and a fuzzy associative memory arithmetic-logical processing.

7. An apparatus for forming and correcting a color image comprising, an input converting means for converting an input image signal into an information value representing a color gamut in a coordinate system of a perceptual color space with the aid of second fuzzy processing means;

a color gamut converting means configured for entering a information value representing a color gamut in a coordinate system of a perceptual color space, associating said information value with an information value representing an other color gamut determined by a pre-set color gamut with the aid of a first fuzzy processing using neural network arithmetic-logical processing from one color component to another for converting, by such association, said color gamut in the coordinate system of the perceptual color space into a converted color gamut which is a prescribed color gamut, and outputting the information value representing the converted color gamut in the coordinate system, wherein said color gamut converting means comprises:

an extracting means for comparing a pre-set reproduction partial color gamut of an input device and a pre-set reproduction color gamut of an output device and extracting a color gamut thereof, a discriminating means for dividing said color gamut into a plural partial color areas based upon plural pre-set memory colors from one color component to another, dividing the reproduction color gamut of the input device or the reproduction color gamut of the output device, whichever is narrower, into plural partial color areas based upon said memory colors from one color component to another; and a mapping means for associating an information value representing the partial color gamut in said color gamut into an information value representing said partial color gamut in said narrower color gamut according to a color area of the input signal with the aid of sad first fuzzy processing means for converting into an information value representing said color gamut which is a prescribed color gamut; and an output converting means for converting the output information value of said color gamut means into an image signal with the aid of third fuzzy processing means.

* * * * *